Patented May 29, 1945

2,376,865

UNITED STATES PATENT OFFICE 2,376,865

ETHERS OF ENDOETHYLENE HYDROXYCY-CLOPENTANOINDANE

Herman A. Bruson, Philadelphia, Pa., assignor to The Resinous Products & Chemical Company, Philadelphia, Pa., a corporation of Delaware No Drawing. Application April 1, 1944,
Serial No. 529,195

13 Claims. (Cl. 260—611)

This invention concerns ethers of endoethylene hydroxycyclopentanoindane and a method for their preparation. More explicitly, this invention deals with new cyclic ethers derived from endomethylene tetrahydrofluorene by an acid-catalyzed addition thereto of an organic compound having at least one alcoholic hydroxyl group with simultaneous rearrangement to form ethers having an endoethylene cyclopentano-indanyl group.

According to this invention, 1,4-endomethylene tetrahydrofluorene is reacted in the presence of an acidic condensing agent with an organic compound having at least one alcoholic hydroxyl group. The resulting addition-rearrangement reaction may be represented as follows:

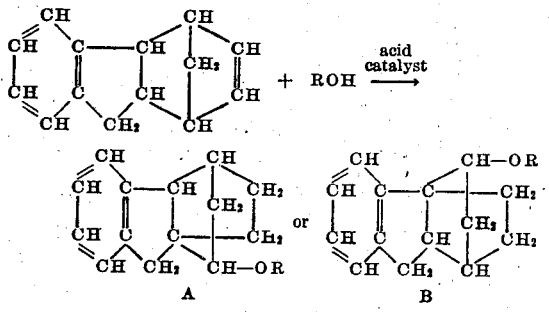

In these products, the functional ether group is attached to an endoethylene cyclopentano group which is joined to an indane group. The empirical formula, $C_{14}H_{15}$—, is used herein to represent the endoethylene cyclopentanoindane nucleus. Of the two isomers shown above, that designated as (A) is the more probable.

When more than one alcoholic hydroxyl group is present in an organic compound, one or more molecules of 1,4-endomethylene tetrahydrofluorene may be reacted with said compound. Each hydroxyl group, if so desired, may be thus reacted simultaneously or consecutively to form mono- or poly-ethers. For example, ethylene glycol, $HOCH_2CH_2OH$, may react with one or with two mols of 1,4-endomethylene tetrahydrofluorene, $C_{14}H_{14}$, thus:

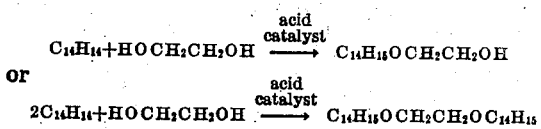

In a similar manner, a molecule of glycerine may react with one, two, or three molecules of 1,4-endomethylene tetrahydrofluorene with accompanying rearrangement. Pentaerythritol may react with as many as four mols of 1,4-endomethylene tetrahydrofluorene per mol thereof, while sorbital may react with as many as six.

The polyethers having three or more ether groups are balsam-like to resinous solids which are thermoplastic, while ethers having fewer hydroxyl groups tend to remain liquid at ordinary temperatures. Many of these liquids may be distilled without decomposition.

The ethers of this invention are primarily of interest in the field of plastics, where they may serve as solvents, softening agents, and plasticizers, and where they also may be used in coating compositions. Some of the new ethers give promise of use in the fields of drugs and insecticides.

The 1,4-endomethylene tetrahydrofluorene used in this invention is readily prepared by heating cyclopentadiene with indene and has been described by Alder and Rickert, Ber. 71, 386 (1938).

In practicing this invention, it has been found that a wide variety of organic compounds containing one or more alcoholic hydroxyl groups may be employed. The hydroxyl group is preferably primary or secondary. Compounds containing a tertiary hydroxyl group may also be used provided, however, that they are not readily dehydrated at or below the temperature at which the reaction is carried on.

The useful alcoholic hydroxyl-containing compounds may be aliphatic, arylaliphatic, cycloaliphatic, hydroaromatic, or heterocyclic, and may be saturated or unsaturated, straight or branched-chained, or cyclic. It has also been established that the non-hydroxyl portion of the reacting hydroxyl-containing compound may contain a wide variety of groups or substituents, for example, halogen, cyano, thiocyano, nitro, keto or acyl, mercapto, ether, acyloxy, alkoxy, aryloxy, carbalkoxy, or carboxy groups, etc.

It should be noted at this point that in the case of compounds having free carboxyl groups, excess 1,4-endomethylene tetrahydrofluorene is necessary, since esterification of the carboxyl group by addition and simultaneous rearrangement occurs in addition to etherification with the alcoholic hydroxyl group.

From the above discussion, it will be evident that under the influence of acidic condensing agents 1,4-endomethylene tetrahydrofluorene forms rearranged ethers with a wide variety of alcoholic hydroxyl-containing compounds and that the new reaction is one of wide applicability. Hydroxyl-containing reactants of perhaps greatest interest belong to the general class of unsubstituted alcohols, whether monohydric or polyhydric, particularly those which are not dehydrated at 60° C. by sulfuric acid. There are, however, important types of reactants other than the simple alcohols. Other important groups include hydroxy acid esters, hydroxy acids, hydroxy ketones, hydroxy lactones, halohydrins, ether alcohols, cyano alcohols, thiocyano alcohols, nitro alcohols, and polymeric hydroxyl-containing compounds, including polyvinyl alcohol, polysaccharides, starches, sugars, cellulose, cellulose ethers, cellulose esters, and the like.

Typical useful hydroxyl-containing compounds for the purpose of this invention are the following: Methanol, ethanol, propanol, isopropanol, n-butanol, isobutanol, butanol-2, the primary and various isomeric amyl alcohols, n-hexanol, 2-ethylbutanol, n-heptanol, n-octanol, capryl alcohol, 2-ethyl hexanol, decanol, 5-ethyl-nonanol-2, dodecyl alcohol, tetradecanol, 7-ethyl-2-methyl-undecanol-4, cetyl alcohol, 3,9-diethyl-tridecanol-6, oleyl alcohol, n-octadecanol, allyl alcohol, crotonyl alcohol, cinnamyl alcohol, geraniol, benzyl alcohol, phenylethyl alcohol, substituted phenylethyl alcohols such as butylphenylethyl alcohol or chlorophenylethyl alcohol, methoxyethanol, ethoxyethanol, butoxyethanol, phenoxyethanol, ethylene glycol, propylene glycol, butylene glycol-1,3, diethylene glycol, triethylene glycol, polyethylene glycols, diisopropylene glycol, diethylene glycol monoethyl ether, diethylene glycol monobutyl ether, diethylene glycol monophenyl ether, glycerol, glyceryl monochlorohydrin, glyceryl dichlorohydrin, glyceryl-$\alpha$-phenyl ether, glyceryl-$\alpha,\gamma$-dimethyl ether, trimethylene glycol, triphenyl carbinol, tetramethylene glycol, decamethylene glycol-1,10, ethylene chlorohydrin, propylene chlorohydrin, ethylene bromohydrin, propargyl alcohol, ethylene cyanohydrin, 2,4-dihydroxy-2-methyl-pentane, propylene cyanohydrin, lactonitrile, mandelonitrile, p-thiocyanophenoxyethanol, 2-nitro-2-methyl-1-propanol, 2-nitro-1-butanol, 2-nitro-2-methyl-1,3-propanediol, 2 - nitro-2 - ethyl-1,3 - propanediol, tris(hydroxymethyl) nitromethane, $\beta$-thiocyanoethoxyethanol, p - tert. - butylphenoxyethanol, o-cyclohexylphenoxyethanol, 2,4-dichlorophenoxyethanol, p - tert. - octylphenoxyethanol, p-phenylphenoxyethanol, $\beta$-naphthoxyethanol, 2-nitrophenoxyethanol, p-acetylphenoxyethanol, p-benzoylphenoxyethanol, cyclohexanol, o-, m-, or p-methylcyclohexanol, cyclopentanol, o- or p-cyclohexyl-cyclohexanol, p-tert.-amylcyclohexanol, hydroxydihydronordicyclopentadiene, borneol, fenchol, cholesterol, ethyl glycolate, ethyl lactate, dimethyl tartrate, ethyl citrate, ethyl-10-hydroxystearate, tetrahydrofurfuryl alcohol, phenylthioethanol, ceryl alcohol, castor oil, hydrogenated castor oil, ethyl ricinoleate, ethyl malate, sorbitol, dibutyl tartrate, glyceryl-$\alpha,\gamma$-diphenyl ether, mannitol, ethylene glycol monobenzyl ether, and many others. The hydroxyl-containing compound need not be pure. There may be used, for instance, technical alcohol mixtures such as are obtained as by-products from the synthetic production of methanol by the reaction of hydrogen and carbon monoxide and known as "higher alcohols from the methanol synthesis." These comprise branched-chained primary and secondary alcohols having from about seven to about eighteen carbon atoms and, in some cases, even more. Mixtures of higher aliphatic alcohols obtained by the catalytic hydrogenolysis of fatty glycerides or of higher fatty acid esters may likewise be used.

Among the acidic condensing agents or catalysts which promote the addition-rearrangement reaction of alcoholic hydroxyl-containing compounds with 1,4-endomethylene tetrahydrofluorene are boron trifluoride and its coordination complexes with oxygenated compounds, sulfuric acid, acid esters of sulfuric acid, such as ethyl acid sulfate, aromatic sulfonic acids, such as toluene sulfonic acids, aliphatic sulfonic acids such as butyl sulfonic acids, and acidic salts, particularly the halides of amphoteric metals, including zinc chloride, stannic chloride, titanium tetrachloride, aluminum bromide, and aluminum chloride.

Sulfuric acid is of particular value in promoting reactions involving the lower primary aliphatic alcohols. It is generally of use in the case of other alcohols which are not readily polymerized or dehydrated by the presence of concentrated sulfuric acid.

The boron trifluoride catalysts comprise a group of considerable value. These catalysts include not only boron trifluoride itself but also its coordination complexes. Of these the complexes with ethers are of particular utility, since they are soluble in the reaction mixtures, produce no troublesome by-products, and are readily removed after completion of the reaction. The coordination complexes include those with ethers, such as $BF_3.C_2H_5OC_2H_5$ or $BF_3.C_4H_9OC_4H_9$, with carboxylic acids such as $BF_3.2CH_3COOH$, with carboxylic esters such as $BF_3.2CH_3COOC_2H_5$, with ketones such as $BF_3.CH_3COCH_3$, with alcohols such as $BF_3.C_2H_5OH$ or $BF_3.C_4H_9OH$, and with water, which may be represented by $BF_3.(H_2O)_x$, where $x$ is one or two.

The quantity of active catalyst employed may be varied over a wide range. Good results have been obtained with as little as two per cent of catalyst, based on the weight of the hydrocarbon, up to and exceeding a molar equivalent of the catalyst per mol of hydrocarbon used. The catalysts need not be used under anhydrous conditions. In fact, the presence of water in small amounts often increases the rate of reaction.

The addition-rearrangement reaction involving an alcoholic hydroxyl-containing compound and 1,4-endomethylene tetrahydrofluorene is readily carried out in the presence of one or more acidic condensing agents. The reaction may be initiated by mixing the components and catalyst at temperatures even as low as 0° C. in some cases, or at room temperature, or at elevated temperatues. While it is generally desirable to control the temperature at the start, the reaction may be carried to completion either by continuing the reaction for a long time or by raising the temperature to accelerate the reactions involved. Temperatures as high as 100° C. to about 200° C. may thus be used. The reaction range of about 50° to 125° C. is, however, generally the most useful and is to be preferred.

In some cases the reactions are sufficiently exothermic so that it is desirable to cool the reacting mixture in order to control the reaction. The reaction may also be controlled by the rate of mixing the reactants and by the use of a solvent or diluent such as, for example, ethylene dichloride, or dioxane.

After the reaction has been carried to a desired point, the acidic condensing agent is removed, as by washing with water or by neutralization. The reaction product may then be distilled in many cases, or otherwise purified, as by treatment with decolorizing clay or carbon, stripping, extraction, etc.

For the purpose of this invention, it is desirable, although not necessary, to employ about one mol equivalent of the alcohol per mol of the hydrocarbon. When an excess of the alcohol is employed, not only does the desired addition-rearrangement reaction occur but also substitution of the benzene ring of the resultant ether may occur.

The following examples illustrate this invention, it being understood that the proportions, temperatures, and time can be varied to a considerable extent without departing from the spirit of the invention.

*Example 1*

(a) To a stirred solution of 60 grams of ethylene chlorohydrin and five grams of boron trifluoride-dibutyl ether complex, $BF_3 \cdot C_4H_9OC_4H_9$, heated to 70° C., there was gradually added 91 grams of 1,4-endomethylene tetrahydrofluorene. The reaction was exothermic, the temperature rising to about 85°–90° C. The mixture was then heated further at 95° C. for five hours with continual stirring. The product was a dark oil. It was washed with warm dilute sodium hydroxide solution, then with water, dried, and distilled in vacuo.

The β-chloroethyl ether of endoethylene hydroxycyclopentanoindane distilled over at 155°–157° C. at 1 mm. as a colorless oil in a yield of 102 grams. It is a useful intermediate for the preparation of insecticides. The Cl atom is readily replaceable by other radicals, for example mercapto, thiocyano, or amino, by heating with NaSH, NaSCN, or primary or secondary amines or ammonia, respectively.

(b) In the same manner, a mixture of 28.4 grams of trimethylene chlorohydrin, 55 grams of 1,4-endomethylene tetrahydrofluorene, and 6 grams of $BF_3 \cdot O(C_4H_9)_2$ heated for five hours at 95° C. yielded 44 grams of the corresponding γ-chloropropyl ether of endoethylene hydroxycyclopentanoindane: $C_{14}H_{15}$—O—$CH_2CH_2CH_2Cl$.

(c) Similarly, a mixture of 26 grams of trimethylene bromohydrin, 34 grams of 1,4-endomethylene tetrahydrofluorene, and five grams of $BF_3 \cdot O(C_2H_5)_2$, stirred for five and one-half hours at 95° C. gave γ-bromopropyl ether of endoethylene hydroxycyclopentanoindane, $$C_{14}H_{15}\text{—O—}CH_2CH_2CH_2Br$$

as a colorless oil boiling at 168°–173° C./0.5 mm.

*Example 2*

A mixture of 55 grams of 1,4-endomethylene tetrahydrofluorene, 36 grams of ethylene cyanohydrin, and five grams of $BF_3 \cdot O(C_4H_9)_2$ was stirred at 95° C. for four hours. The dark oil obtained was washed with dilute sodium hydroxide solution and with water, dried, and distilled in vacuo.

The β-cyanoethyl ether of endoethylene hydroxycyclopentanoindane was obtained as a colorless oil boiling at 174°–176° C./2 mm. in a yield of fifty grams.

*Example 3*

To a stirred mixture of 93 grams of ethylene glycol (1.5 mols) and four grams of $BF_3 \cdot O(C_4H_9)_2$ heated to 70° C., there was gradually added 91 grams of 1,4-endomethylene tetrahydrofluorene (0.5 mol) during the course of twelve minutes. The mixture was then heated at 95° C. for four hours with constant, rapid stirring, and was worked up as in Example 2.

The β-hydroxyethyl mono-ether of endoethylene hydroxycyclopentanoindane, $$HOCH_2CH_2\text{—O—}C_{14}H_{15}$$

was obtained as a colorless oil boiling at 157°–159° C./1 mm. The yield was 78 grams.

*Example 4*

A mixture consisting of 55 grams of 1,4-endomethylene tetrahydrofluorene (0.3 mol), 95.4 grams of diethylene glycol (0.9 mol), and 10 grams of $BF_3 \cdot O(C_4H_9)_2$ was stirred and heated at 95° C. for six and one-quarter hours. The product was washed with dilute sodium hydroxide solution and with water, then dried, and distilled in vacuo.

The β-hydroxyethoxyethyl mono-ether of endoethylene hydroxycyclopentanoindane, $$C_{14}H_{15}\text{—O—}CH_2CH_2\text{—O—}CH_2CH_2OH$$

is a colorless oil boiling at 175°–177° C./0.5 mm. The yield was 50.5 grams.

*Example 5*

A mixture consisting of 55 grams of 1,4-endomethylene tetrahydrofluorene (0.3 mol) and 92 grams of glycerol (1 mol) was stirred at 90°–95° C. with 10 grams of $BF_3 \cdot O(C_4H_9)_2$ for eight hours and worked up as in Example 4. The glyceryl mono-ether of endoethylene hydroxycyclopentanoindane, $C_{14}H_{15}$—O—$CH_2CHOH$—$CH_2OH$ distilled over at 210°–220° C./0.5–1 mm. as a viscous oil in a yield of 42 grams. Upon redistillation, the pure compound boiled at 200° C./0.5 mm.

*Example 6*

A mixture of 55 grams of 1,4-endomethylene tetrahydrofluorene (0.3 mol) and 9.3 grams of ethylene glycol (0.15 mol) was stirred at 95° C. with six grams of $BF_3 \cdot O(C_4H_9)_2$ for seven hours. The product was neutralized, washed, and distilled in vacuo. The product boiling at 265°–275° C./1 mm. was the glycol di-ether of endoethylene hydroxycyclopentanoindane.

$$C_{14}H_{15}\text{—O—}CH_2CH_2\text{—O—}C_{14}H_{15}$$

It is a viscous balsam.

*Example 7*

A mixture of 55 grams of 1,4-endomethylene tetrahydrofluorene, 35 grams of ethyl lactate, and 6 grams of $BF_3 \cdot O(C_2H_5)_2$ was heated at 90° C. for three hours. The product was washed with dilute sodium carbonate solution and then with water, dried, and distilled in vacuo. The ether of endoethylene hydroxycyclopentanoindane and ethyl lactate having the formula:

$$C_{14}H_{15}\text{—O—}\overset{\overset{\displaystyle CH_3}{|}}{CH}\text{—}COOC_2H_5$$

distilled over at 165°–170° C./0.5 mm. as a pale yellow oil in a yield of 50 grams. Upon saponification, it yields the corresponding ether acid, $$C_{14}H_{15}\text{—O—}CH(CH_3)\text{—}COOH$$

the polyvalent metal salts of which are soluble in oils and hydrocarbons. Its copper, mercury, and bismuth salts possess fungicidal activity; its lead, cobalt, zinc, and manganese salts are of value as siccatives for paints and varnishes.

*Example 8*

To a stirred solution of 36 grams of 2-nitro-2-methyl-propanol-1 and 55 grams of 1,4-endomethylene tetrahydrofluorene at 50° C., there was gradually added four grams of $BF_3 \cdot O(C_4H_9)_2$. The exothermic reaction carried the temperature to 65° C. The mixture was then stirred at 65° C. for six hours, washed with dilute soda solution and with water, dried, and distilled in vacuo.

The β-nitro-isobutyl ether of endoethylene hydroxycyclopentanoindane, having the formula:

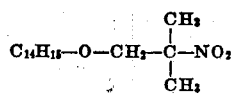

distilled over at 195°–205° C./1 mm. as a viscous pale yellow oil. Upon redistillation, the pure compound boiled at 183°–187° C./1 mm.

Example 9

Methanol (16 grams) was cooled to 5° C. and gradually mixed with 10 grams of 98% sulfuric acid so that the temperature did not exceed 25° C. To this solution of methyl sulfuric acid ester there was added 55 grams of 1,4-endomethylene tetrahydrofluorene, and the mixture was stirred and boiled under reflux on a steam bath for two hours. The washed, neutralized proudct was distilled in vacuo. The crude methyl ether of endoethylene hydroxycyclopentanoindane.

distilled over at 120°–130° C./1 mm. as a colorless oil in a yield of 45 grams. Upon redistillation, the pure compound boiled at 147°–149° C./6 mm.

Example 10

The procedure described in Example 9 was applied to 46 grams of ethanol, 20 grams of 98% sulfuric acid, and 55 grams of 1,4-endomethylene tetrahydrofluorene, the mixture being heated for eight hours at 90°–92° C. The crude ethyl ether of endoethylene hydroxycyclopentanoindane,

distilled over at 128°–138° C./1 mm. as a colorless oil. Upon redistillation, the pure compound boiled at 152°–155° C./6 mm.

Example 11

A mixture of 37.4 grams of β-chloroethoxyethanol, 55 grams of 1,4-endomethylene tetrahydrofluorene, and 6 grams of BF₃.O(C₄H₉)₂ was stirred at 95° C. for four and one-half hours, then washed, dried, and distilled in vacuo.

The crude β-chloroethoxyethyl ether of endoethylene hydroxycyclopentanoindane,

distilled over at 170°–180° C./0.5 mm. as an almost colorless oil in a yield of 63 grams. The pure compound boiled at 170°–173° C./0.5 mm.

Example 12

A mixture of 78 grams of 2-ethyl hexanol, 55 grams of 1,4-endomethylene tetrahydrofluorene, and 10 grams of BF₃.O(C₄H₉)₂ heated for six and one-half hours at 95° C. yielded the ethylhexyl ether of endoethylene hydroxycyclopentanoindane as a colorless oil boiling at 173°–176° C./1 mm.

Example 13

A mixture of 50 grams of cyclohexanol, 55 grams of 1,4-endomethylene tetrahydrofluorene, and 7 grams of BF₃.O(C₄H₉)₂ heated for seven hours at 95° C. yielded the cyclohexyl ether of endoethylene hydroxycyclopentanoindane as a viscous colorless oil boiling at 164°–166° C./0.5 mm.

Example 14

A mixture of 54 grams of benzyl alcohol, 55 grams of 1,4-endomethylene tetrahydrofluorene, and 6 grams of BF₃.O(C₄H₉)₂ was heated and stirred at 95° C. for seven and one-quarter hours. The product was washed with dilute sodium hydroxide solution and with water, dried, and distilled in vacuo.

The benzyl ether of endoethylene hydroxycyclopentanoindane distilled over at 190°–200° C./1 mm. as an oil in a yield of 49 grams. Upon redistillation, the pure compound boiled at 195° C./1 mm. On standing, it solidifies to a colorless crystalline solid.

Example 15

A mixture of 56 grams of lauryl alcohol, 55 grams of 1,4-endomethylene tetrahydrofluorene, and 7 grams of BF₃.O(C₄H₉)₂ was stirred at 115°–120° C. for six hours, then neutralized, washed, dried, and distilled in vacuo.

The crude n-dodecyl ether of endoethylene hydroxycyclopentanoindane, $$C_{12}H_{25}—O—C_{14}H_{15}$$

distilled over at 220°–230° C./1 mm. as a pale yellow oil. Upon redistillation, the pure compound boiled at 219°–224° C./1 mm.

Example 16

A mixture of 58 grams of allyl alcohol, 55 grams of 1,4-endomethylene tetrahydrofluorene, and 6 grams of BF₃.O(C₄H₉)₂ was stirred at 90° C. for six hours, then neutralized, washed, dried, and distilled in vacuo.

The allyl ether of endoethylene hydroxycyclopentanoindane is a colorless oil boiling at 167°–170° C./7 mm. The yield was 45 grams.

Example 17

A mixture of 51 grams of tetrahydrofurfuryl alcohol, 55 grams of 1,4-endomethylene tetrahydrofluorene, and 6 grams of BF₃.O(C₂H₅)₂ heated for six and one-quarter hours at 90°–95° C. yielded 27 grams of tetrahydrofurfuryl ether of endoethylene hydroxycyclopentanoindane as a colorless oil boiling at 169°–173° C./0.5 mm.

Example 18

A mixture of 45 grams of β-ethoxyethanol ("Cellosolve"), 55 grams of 1,4-endomethylene tetrahydrofluorene, and 7 grams of BF₃.O(C₄H₉)₂ stirred at 95° C. for six and three-quarter hours yielded 43 grams of the ethoxyethyl ether of endoethylene hydroxycyclopentanoindane as a colorless oil boiling, when pure, at 155°–158° C./1 mm.

Example 19

A mixture of 55 grams of β-phenoxyethanol, 55 grams of 1,4-endomethylene tetrahydrofluorene, and 7 grams of BF₃.O(C₄H₉)₂ heated for five hours at 95°–100° C. yielded 70 grams of the phenoxyethyl ether of endoethylene hydroxycyclopentanoindane as a colorless oil boiling at 213°–216° C./1 mm.

Example 20

A mixture of 32 grams of ethyl glycolate, 55 grams of 1,4-endomethylene tetrahydrofluorene, and 5 grams of BF₃.O(C₂H₅)₂ heated for six hours at 90°–95° C. yielded 32 grams of ethyl glycolate ether of endoethylene hydroxycyclopentanoindane, $$C_2H_5OOC—CH_2—O—C_{14}H_{15}$$

as a colorless viscous oil boiling at 165°–170° C./1 mm.

Example 21

A mixture of 44 grams of

and 55 grams of 1,4-endomethylene tetrahydrofluorene, when heated at 95° C. with 7 grams of BF₃.O(C₄H₉)₂ for three hours, yielded 46 grams of β-thiocyanoethoxyethyl ether of endoethylene hydroxycyclopentanoindane as a viscous pale yellow oil boiling, when pure, at 215°-220° C./1 mm.

Example 22

A mixture of 32.5 grams of 1-chloro-2-hydroxy-2-methylpropane (isobutylene chlorohydrin) and 55 grams of 1,4-endomethylene tetrahydrofluorene was stirred at 95° C. for seven hours with four grams of BF₃.O(C₄H₉)₂. After being neutralized with dilute soda solution, washed with water, dried, and distilled in vacuo, the corresponding chloro-tert.-butyl ether of endoethylene hydroxychloropentanoindane was obtained as a colorless oil boiling at 152°-158° C./1-2 mm.

Example 23

A mixture of 49 grams of diethylene glycol monobutyl ether ("Butyl Carbitol"), 55 grams of 1,4-endomethylene tetrahydrofluorene, and 7 grams of BF₃.O(C₄H₉)₂ stirred at 95° C. for six and three-quarter hours yielded 49 grams of the n-butyloxyethoxyethyl ether of endoethylene hydroxycyclopentanoindane,

C₄H₉—O—CH₂CH₂—O—CH₂CH₂—O—C₁₄H₁₅ as a colorless oil boiling at 192°-196° C./1 mm.

Example 24

A mixture of 33 grams of glyceryl-α-monochlorohydrin, 55 grams of 1,4-endomethylene tetrahydrofluorene, and four grams of

BF₃.O(C₄H₉)₂ stirred for two and one-half hours at 85°-90° C. yielded 36 grams of the corresponding 1-chloro-2-hydroxypropyl ether of endoethylene hydroxycyclopentanoindane, ClCH₂—CHOH—CH₂—O—C₁₄H₁₅ as a viscous colorless oil boiling at 190°-195° C./1 mm.

Of particular interest are the ethers prepared from ethylene chlorohydrin, propylene chlorohydrin, diethylene glycol chlorohydrin, glyceryl monochlorohydrin, and other aliphatic halogenated alcohols with 1,4-endomethylene tetrahydrofluorene, since these new ethers possess active halogen atoms which can be readily replaced by other groups or radicals (—SH, —S—R, —CN, —SCN, —SO₃Na, —NH₂, —NH—R,

by metathetical reactions to give mercaptans, thioethers, nitriles, thiocyanates, sulfonates, or amines useful in many diversified fields of industry.

The cyclic ethers of this invention are further characterized by the presence in the ring system of a phenyl ring which is still capable of undergoing the usual reactions of benzene rings, such as nitration and sulfonation. Halogen groups may be introduced. The phenyl group takes part in Friedel-Crafts reactions. It may be reduced to give a saturated ring. It reacts with olefines and, as has been already indicated, with alcohols to introduce alkyl groups in the benzene ring. The new ethers are, therefore, compounds of exceptional reactivity and provide a means for the synthesis of a great number of hitherto unknown compounds.

I claim:
1. A method for preparing ethers of endoethylene hydroxycyclopentanoindane which comprises reacting 1,4-endomethylene tetrahydrofluorene in the presence of an acidic condensing agent with an organic compound possessing an alcoholic hydroxyl group.
2. A method for preparing ethers of endoethylene hydroxycyclopentanoindane which comprises reacting an alcohol with 1,4-endomethylene tetrahydrofluorene in the presence of a boron trifluoride catalyst.
3. A method for preparing ethers of endoethylene hydroxycyclopentanoindane which comprises reacting an aliphatic alcohol with 1,4-endomethylene tetrahydrofluorene in the presence of a boron trifluoride catalyst.
4. A method for preparing ethers of endoethylene hydroxycyclopentanoindane which comprises reacting an aliphatic halogenated alcohol with 1,4-endomethylene tetrahydrofluorene in the presence of a boron trifluoride catalyst.
5. A method for preparing ethers of endoethylene hydroxycyclopentanoindane which comprises reacting β-chloroethanol with 1,4-endomethylene tetrahydrofluorene in the presence of a boron trifluoride catalyst.
6. A method for preparing ethers of endoethylene hydroxycyclopentanoindane which comprises reacting β-chloroethoxyethanol with 1,4-endomethylene tetrahydrofluorene in the presence of a boron trifluoride catalyst.
7. A method for preparing ethers of endoethylene hydroxycyclopentanoindane which comprises reacting glyceryl monochlorohydrin with 1,4-endomethylene tetrahydrofluorene in the presence of a boron trifluoride catalyst.
8. As a new compound, an acid-catalyzed addition-rearrangement product of an organic alcoholic hydroxyl-containing compound and 1,4-endomethylene tetrahydrofluorene, said product being an ether of endoethylene hydroxycyclopentanoindane and the said hydroxyl-containing compound.
9. As a new compound, an acid-catalyzed addition-rearrangement product of an aliphatic alcohol and 1,4-endomethylene tetrahydrofluorene, said compound being an aliphatic ether of endoethylene hydroxycyclopentanoindane.
10. As a new compound, an acid-catalyzed addition-rearrangement product of an aliphatic halogenated alcohol and 1,4-endomethylene tetrahydrofluorene, said compound being a haloalkyl ether of endoethylene hydroxycyclopentanoindane.
11. As a new compound, an acid-catalyzed addition-rearrangement product of β-chloroethanol and 1,4-endomethylene tetrahydrofluorene, said compound being a β-chloroethyl ether of endoethylene hydroxycyclopentanoindane.
12. As a new compound, an acid-catalyzed addition-rearrangement product of β-chloroethoxyethanol and 1,4-endomethylene tetrahydrofluorene, said compound being a β-chloroethoxyethyl ether of endoethylene hydroxycyclopentanoindane.
13. As a new compound, an acid-catalyzed addition - rearrangement product of glyceryl monochlorohydrin and 1,4-endomethylene tetrahydrofluorene, said compound being a γ-chloro-β-hydroxypropyl ether of endoethylene hydroxycyclopentanoindane.

HERMAN A. BRUSON.